(12) United States Patent
Vollmer

(10) Patent No.: US 9,291,197 B2
(45) Date of Patent: Mar. 22, 2016

(54) MAGNETIC RADIAL BEARING WITH THREE-PHASE CONTROL

(75) Inventor: Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 168 days.

(21) Appl. No.: 14/118,742

(22) PCT Filed: Apr. 25, 2012

(86) PCT No.: PCT/EP2012/057548
§ 371 (c)(1),
(2), (4) Date: Nov. 19, 2013

(87) PCT Pub. No.: WO2012/159842
PCT Pub. Date: Nov. 29, 2012

(65) Prior Publication Data
US 2014/0097782 A1    Apr. 10, 2014

(30) Foreign Application Priority Data
May 20, 2011   (EP) .................................... 11166910

(51) Int. Cl.
*H02K 7/09* (2006.01)
*F16C 32/04* (2006.01)

(52) U.S. Cl.
CPC ........... *F16C 32/0463* (2013.01); *F16C 32/048* (2013.01); *F16C 32/0444* (2013.01); *F16C 32/0453* (2013.01); *F16C 32/0457* (2013.01); *F16C 32/0461* (2013.01)

(58) Field of Classification Search
USPC ............ 318/504, 252, 440.41, 720, 716, 496, 318/523, 527; 310/90.5
See application file for complete search history.

(56) References Cited

U.S. PATENT DOCUMENTS

| | | | |
|---|---|---|---|
| 2,201,699 A | 12/1936 | Myers | |
| 3,694,041 A * | 9/1972 | Studer | F16C 32/0493 310/90.5 |
| 4,245,869 A * | 1/1981 | Scheffer | F16C 32/048 310/90.5 |
| 2001/0013733 A1* | 8/2001 | Schob | F16C 32/0463 310/90.5 |
| 2004/0150278 A1 | 8/2004 | Okada et al. | |
| 2010/0013332 A1* | 1/2010 | Vollmer | F16C 32/0463 310/90.5 |
| 2010/0181855 A1* | 7/2010 | Denk | F16C 32/0457 310/90.5 |

FOREIGN PATENT DOCUMENTS

| | | |
|---|---|---|
| DE | 10 2007 028 229 B3 | 9/2008 |
| JP | 2004-132513 | 4/2004 |
| RU | 2037684 | 6/1995 |
| WO | WO 97/07341 A1 | 2/1997 |

OTHER PUBLICATIONS

Gerhard Schweitzer, Eric H. Maslen; "Magnetic Bearings—Theory, Design, and Application to Rotating Machinery"; pp. 82-84 + 96; 2009, Springer-Verlag; 2009.

* cited by examiner

*Primary Examiner* — Jorge L Carrasquillo
(74) *Attorney, Agent, or Firm* — Henry M. Feiereisen LLC

(57) ABSTRACT

A magnetic radial bearing with low eddy current losses is made compact and easily actuable. For this purpose, a radial bearing with four coils (S1, S2, S3, S4) is proposed, said coils lying opposite one another in pairs on two axes (X, Y). The coils are controlled by a three-phase current (U, V and W). The amplitudes of the currents of the phases (U, V and W) are each evaluated using a sine function which is phase-shifted with respect to one another through 120 DEG. The control is performed by a control device at a variable operating point, which fixes the value for the evaluation of the amplitudes for the individual phases corresponding to the respective sine function.

9 Claims, 4 Drawing Sheets

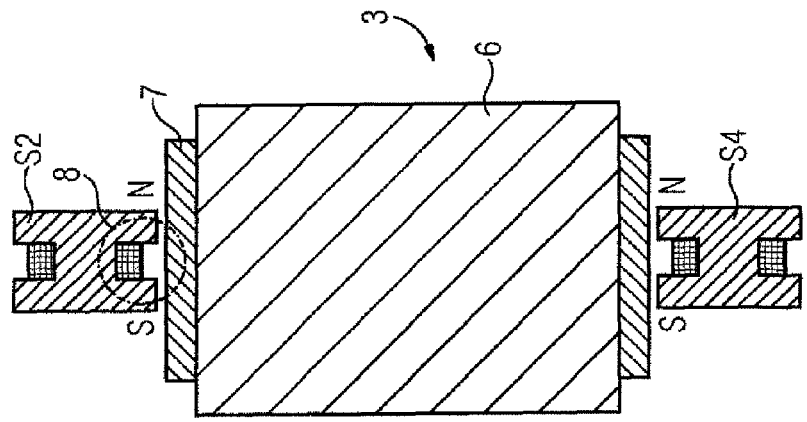
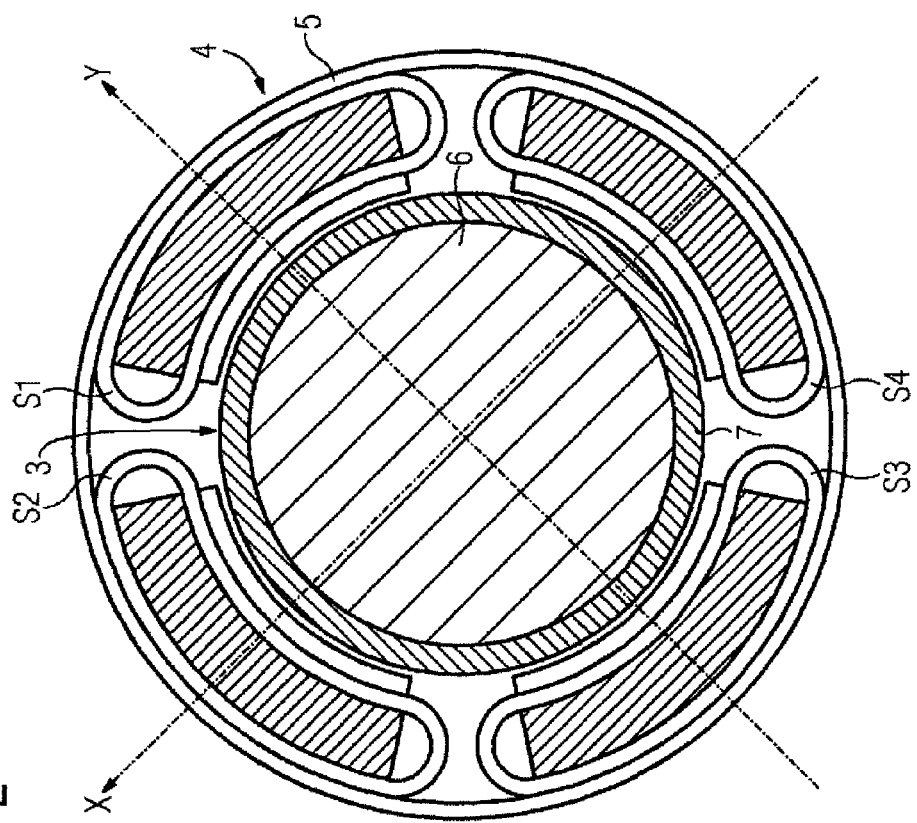

MAGNETIC RADIAL BEARING WITH THREE-PHASE CONTROL

CROSS-REFERENCES TO RELATED APPLICATIONS

This application is the U.S. National Stage of International Application No. PCT/EP2012/057548, filed Apr. 25, 2012, which designated the United States and has been published as International Publication No. WO 2012/159842 and which claims the priority of European Patent Application, Serial No. 11166910.7, filed May 20, 2011, pursuant to 35 U.S.C. 119 (a)-(d).

BACKGROUND OF THE INVENTION

The present invention relates to a magnetic radial bearing having a stator which has a first coil, a second coil, a third coil and a fourth coil, the first coil and the third coil thereof on a first axis opposing the second coil and the fourth coil thereof on a second axis. The present invention further relates to a method for controlling such a magnetic radial bearing.

Magnetic radial bearings produce eddy currents in rotating shafts. Said eddy currents lead to undesired heating of the shaft. The power loss associated therewith reduces the efficiency of the machine. A laminated magnetic return path on the shaft, which would reduce the eddy currents, decreases the rigidity of the shaft.

Hitherto, therefore, a compromise was sought between the lowest possible eddy current losses and the greatest possible rigidity. The pole numbers of the magnetic fields, the rotational speed of the shaft and the type of lamination are substantially responsible for the eddy current losses. In order to achieve low magnetic reversal frequencies, a low pole number is sought. As a result, however, the magnetic field penetrates deep into the rotor and thus requires a lamination with a deep rotor armature, resulting in a thin shaft. If a critical level of inherent instability is exceeded, the pole number has to be increased, which in turn leads to higher frequencies and losses.

A cross-section through a conventional radial magnetic bearing is shown in FIG. 1. The stator in this case has eight coils inserted in axial grooves, wherein in FIG. 1 only the coils 1 and the coil cores 2 are indicated schematically. A rotor 3 is magnetically retained in the interior of the stator. The rotor 3 is the shaft to be mounted. The axes of the coils 1 in this case run substantially radially relative to the rotational axis of the rotor 3.

Radial magnetic bearings with axial coils are also known from the book "Magnetic Bearings" by Gerhard Schweitzer and Eric H. Maslen, Springer Verlag Berlin, 2009, XV, Pages 82 to 84 and 96. In other words, the coil axes extend parallel to the bearing axis. Accordingly, the flux is guided substantially in the axial direction both in the coils and in the rotor.

SUMMARY OF THE INVENTION

The object of the present invention is to provide a radial magnetic bearing which can be controlled and/or adjusted in a simple and reliable manner. Moreover, a suitable method for controlling the magnetic radial bearing is also intended to be provided.

According to the invention, this object is achieved by a magnetic radial bearing having
a stator which has a first coil, a second coil, a third coil and a fourth coil, the first coil and the third coil thereof on a first axis opposing the second coil and the fourth coil thereof on a second axis, and having
a control device for controlling the coils of the stator with a 3-phase current which has the phases U, V and W, wherein
for controlling the first axis
a first terminal of the second coil and a first terminal of the fourth coil are connected to the phase U,
a second terminal of the second coil is connected to the phase W and
a second terminal of the fourth coil is connected to the phase V,
for controlling the second axis
a first terminal of the first coil and a first terminal of the third coil are connected to the phase U.
a second terminal of the first coil is connected to the phase W and
a second terminal of the third coil is connected to the phase V,
the amplitudes of the currents of the phases U, V and W are evaluated in each case by a sine function, phase-shifted relative to one another through 120 degrees, and
the control takes place in each case by means of the control device for each of the axes at a variable operating point, which fixes the value for the evaluation of the amplitudes for the individual phases according to the respective sine function.

Moreover, according to the invention a method is provided for controlling a magnetic radial bearing having a stator which has a first coil, a second coil, a third coil and a fourth coil, the first coil and the third coil thereof on a first axis opposing the second coil and the fourth coil thereof on a second axis, by
controlling the coils of the stator with a 3-phase current which has the phases U, V and W, wherein
for controlling the first axis
a first terminal of the second coil and a first terminal of the fourth coil are connected to the phase U,
a second terminal of the second coil is connected to the phase W and
a second terminal of the fourth coil is connected to the phase V,
for controlling the second axis
a first terminal of the first coil and a first terminal of the third coil are connected to the phase U,
a second terminal of the first coil is connected to the phase W and
a second terminal of the third coil is connected to the phase V,
the amplitudes of the currents of the phases U, V and W are evaluated in each case by a sine function, phase-shifted relative to one another by 120 degrees, and
the control for each of the axes takes place in each case at a variable operating point, which fixes the value for the evaluation of the amplitudes for the individual phases according to the respective sine function.

Advantageously, three-phase control of the coils of the radial bearing is possible and a very low pole number may be achieved, namely the pole pair number p=0 for basic excitation and/or pre-magnetizing. The load-bearing field may be produced with a pole pair number p=1. As a whole, the extremely low magnetic reversal frequencies enable the eddy current losses to be correspondingly low.

Preferably, the first axis is located perpendicular to the second axis. Thus orthogonal forces may be produced by which the rotor can be retained exactly in the center of the stator.

In a preferred embodiment, an operating range is defined for the variable operating point, said operating range lying between two limit values which are at a predetermined interval from an angle value, wherein the angle value is assigned to a point of intersection of two of the sine functions. Limiting the operating point to the operating range ensures that the desired forces are always produced by the individual coils.

Specifically, the operating range may be increased by $\pi/3$. Defined force ratios of the coils are always provided by means of this increase in the operating range.

It is also advantageous if the coils of the stator in each case are axial coils relative to the rotational axis of the radial bearing. This has the advantage that the construction of the radial bearing can be very compact.

Moreover, the coils of the stator should have the same winding direction. As a result, the control can be implemented in a simpler manner.

As has already been indicated above, in a preferred embodiment the basic excitation of the coils with a pole-pair number $p=0$ may be adjusted by the control device. This has the aforementioned advantage of low eddy current losses.

Moreover, the load-bearing excitation of the coils with a pole-pair number $p=1$ may be adjusted by the control device. Thus with a very low pole-pair number a force may be produced in the direction of one of the axes perpendicular to the rotational axis of the rotor. As the pole pair number is in turn very low, correspondingly low eddy current losses should be expected.

BRIEF DESCRIPTION OF THE DRAWINGS

The present invention is described in more detail with reference to the accompanying drawings, in which:

FIG. 2 shows a cross-section through a magnetic radial bearing according to the invention;

FIG. 3 shows a section along one of the axes X, Y through the magnetic radial bearing of FIG. 2;

DETAILED DESCRIPTION OF PREFERRED EMBODIMENTS

Figure 1:
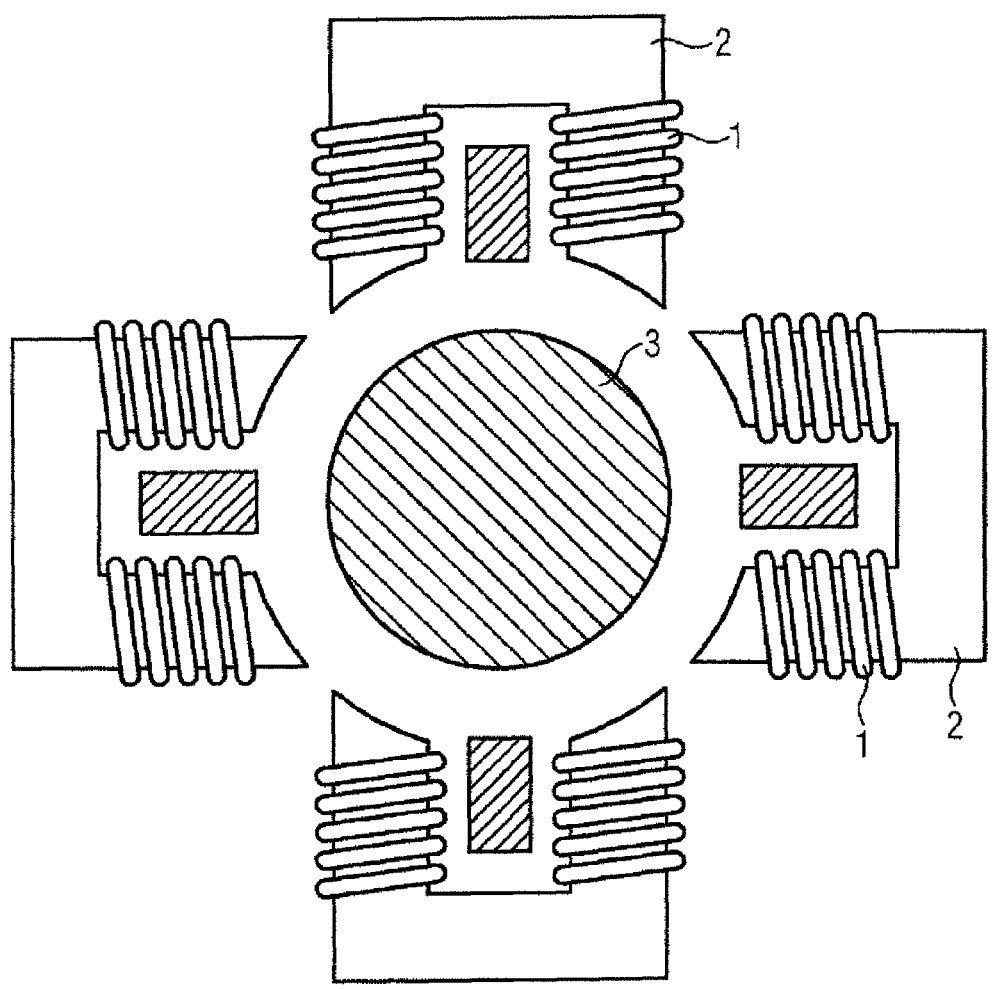
FIG. 1 shows a cross-section through a conventional magnetic radial bearing.

The exemplary embodiments set forth in more detail below represent preferred embodiments of the present invention.

In the exemplary embodiment of FIG. 2, a magnetic radial bearing is shown with a stator 4 and a rotor 3. The stator 4 has a housing 5 which is of hollow cylindrical configuration. Four coils S1, S2, S3 and S4 are located in the interior of the housing 5, fitted closely against the housing wall or at least following the shape of the housing wall. Said coils S1 to S4 are axial coils and/or axially arranged coils. This means that the coil axis extends parallel to the bearing axis (perpendicular to the drawing plane of FIG. 2). In the sectional view of FIG. 2, each coil S1 to S4 extends in a quadrant within the housing 5. Each coil extends almost over the entire 90° of the respective quadrant. In this case, an external portion and an internal portion extend concentrically to the housing 5. A free space is thus produced in the interior of the bearing in which the rotor 3 is freely movable. The rotor 3 has in this case a shaft 6 which is surrounded in the manner of a casing by a lamination 7. The bearing gap which is typically $2/10$ to $3/10$ mm is located between the rotor 3 and the stator 4.

The coils S2 and S4 oppose one another on a first axis X which forms the bisector of the second and fourth quadrants and extends through the bearing axis. Moreover, the coils S1 and S3 oppose one another on a second axis Y which forms the bisector of the first quadrant and the third quadrant and also extends through the bearing axis. Accordingly the coils S2 and S4 primarily exert forces along the X-axis and the coils S1 and S3 primarily exert forces along the Y-axis.

In FIG. 3, the magnetic radial bearing of FIG. 2 is shown along an axial section through the X-axis or Y-axis. In this view, the rotor is clearly visible with the shaft 6 and the lamination 7. In this case, the rotor is visibly surrounded by the coils S2 and S4. In FIG. 3 the guidance of the magnetic flux is shown symbolically. Accordingly, the magnetic flux is guided in the axial direction through the coil and guided back through the lamination 7 in the opposing direction outside the coil. By means of the four axial coils, a magnetic radial bearing having a thick shaft 6 and small rotor lamination depth and short construction may be achieved.

In particular, with this construction it is possible to guide the flux axially with the lowest number of poles. Pre-magnetizing may be produced by a field with the pole-pair number $p=0$. In this case, exclusively north poles N or exclusively south poles S are distributed on the periphery. This is indicated in FIG. 3 by the symbols N and S.

If the poles are designed to be of the same strength on the circumference, this corresponds to basic excitation without load-bearing force. If, however, load-bearing force is required (the shaft 6 has to be pulled upwards counter to the weight force) the poles in the coils S1 and S2 have to be configured to be stronger than the poles in the coils S3 and S4. This uneven configuration of the poles, with the lowest number of poles, results in the pole-pair number $p=1$. Both the basic excitation and the load-bearing excitation may be produced by the same coils.

Due to the low pole-pair numbers, a very low magnetic reversal frequency is produced so that the eddy current losses are correspondingly low. Moreover, a low penetration depth is achieved by the axial flux guidance.

Figure 4:
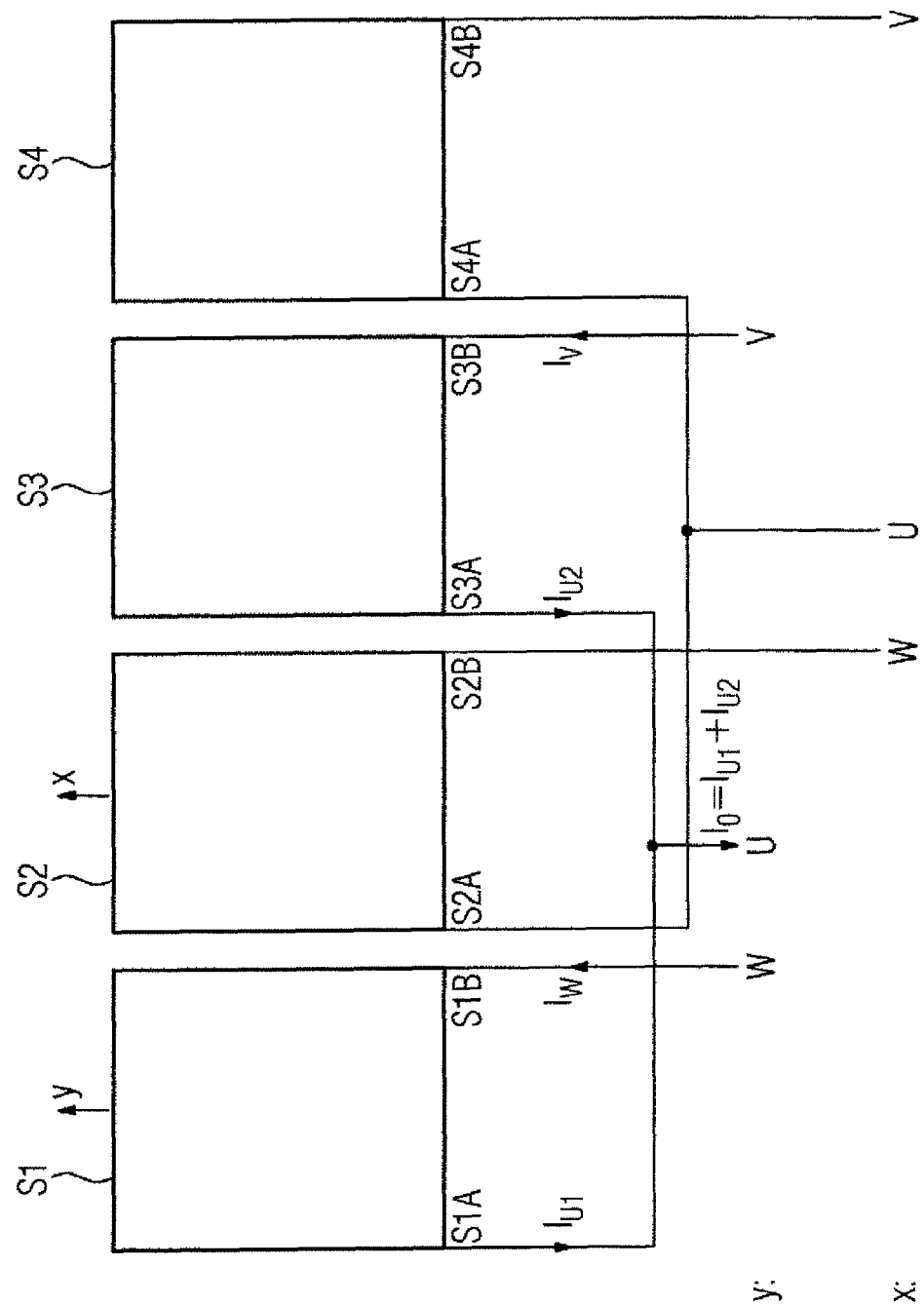
FIG. 4 shows the coils of the magnetic radial bearing connected in circuit with three-phase control and FIG. 5 shows an evaluation of the control currents of the three phases.
Figure 5:
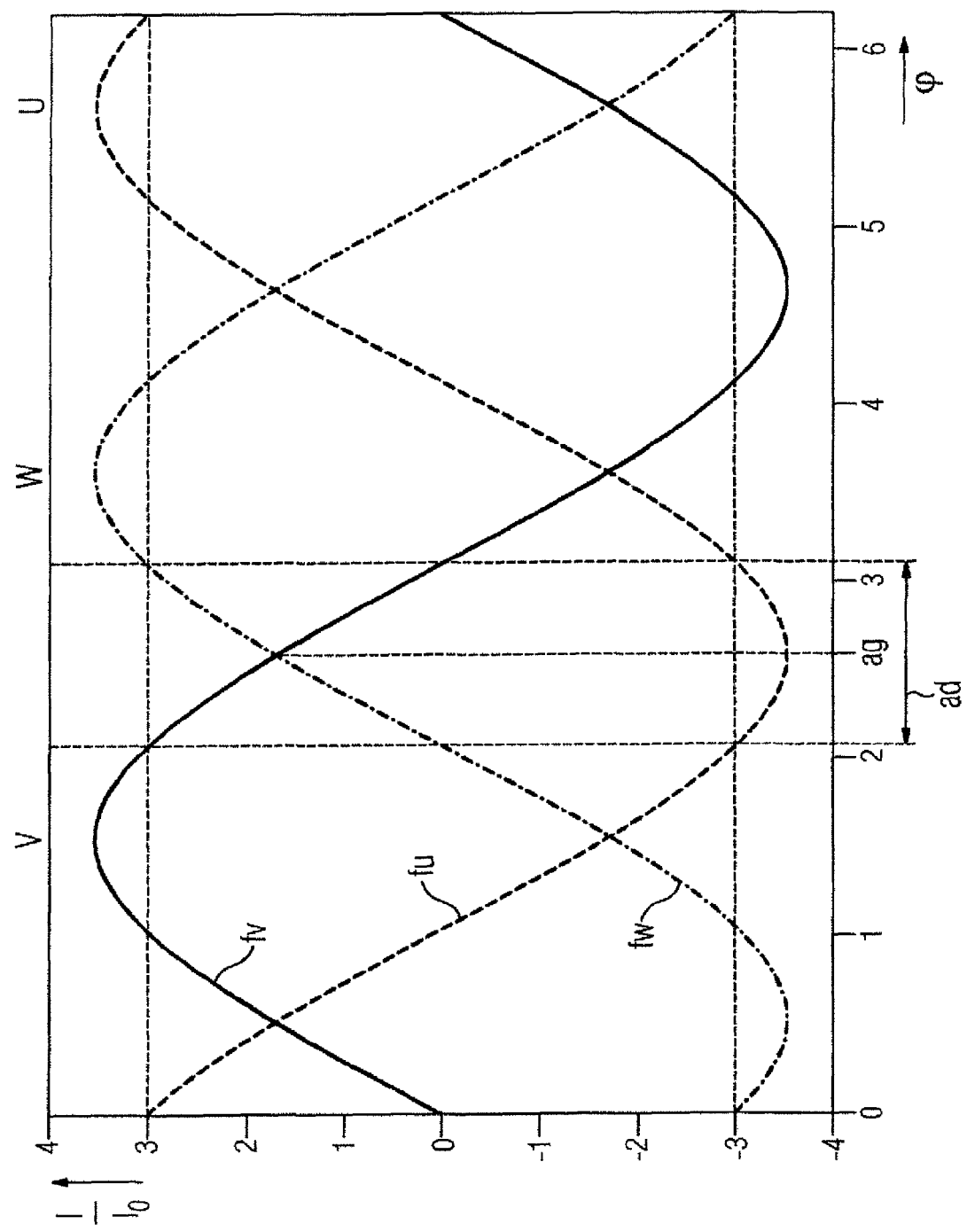

With reference to FIG. 4 and FIG. 5, it will now be explained how the magnetic radial bearing may be controlled in order to retain the rotor in a stable manner in the stator. To this end, FIG. 4 shows the coils S1 to S4 connected in circuit. Each of the coils has a first terminal and second terminal. Accordingly, the first coil S1 has a first terminal S1A and a second terminal S1B. The second coil S2 has a first terminal S2A and a second terminal S2B. The third coil has a first terminal S3A and a second terminal S3B. Finally, the fourth coil S4 has a first terminal S4A and a second terminal S4B. The coils S1 and S3 on the second axis Y and the coils S2 and S4 on the first axis X oppose one another.

According to the present invention, the coils S1 to S4 are controlled by a three-phase current. Said current has the phases U, V and W. For controlling and/or adjusting the forces along the Y-axis (second axis) the first terminals S1A and S3A of the first coil S1 and the third coil S3 are connected to the phase U. The second terminal S1B of the first coil S1 is connected to phase W and the second terminal S3B of the third coil S3 is connected to the phase V. Similarly, for controlling and/or adjusting the forces along the X-axis (first axis) the first terminals S2A and S4A of the second coil S2 and the fourth coil S4 are connected to the phase U, the second terminal S2B of the second coil S2 is connected to the phase W and the second terminal S4B of the fourth coil S4 is connected to the phase V. Accordingly, for example a current $I_W$ flows into the coil S1 and a current $I_{U1}$ flows out of said coil, where $I_W=I_{U1}$. The current $I_V$ flows into the coil S3 and the current $I_{U2}$ flows out of said coil, where $I_V=I_{U2}$. Therefore the current $I_U=I_{U1}+I_{U2}$ flows out of the coils S1 and S3. If the currents $I_V$ and $I_W$ of the phases V and W are the same, the same current flows through all coils. The rotor 3 is then operated with the same force by all four coils. This corresponds to the basic excitation.

In FIG. 5 a phase diagram of the currents of the phases U, V and W is reproduced. According to the invention each phase is evaluated according to the sine functions fu, fv, fw shown there.

A control device which is connected to the coils S1 to S4 undertakes this evaluation and a corresponding control.

In order to be able to identify the sinusoidal path of said functions fu, fv and fw, in each case a whole period ($2\pi$) of the respective function is shown. Accordingly, for a specific operating point which corresponds to an angle $\phi$, in each case a relative current value $I/I_0$ is produced. The sine functions fu, fv and fw are in each case phase-shifted relative to one another by 120° ($2\pi/3$).

As has been mentioned above, with basic excitation the same current flows through all coils. In particular, the same current flows accordingly at the terminals S1B and S3B of the phases W and V. This means, however, that the sine functions fv and fw must intersect at the operating point of the basic excitation. In FIG. 5 an operating point ag of the basic excitation is assigned to the point of intersection. The maximum evaluation function and/or sine function fu of the phase U is produced at this operating point ag. The function fu at this point is double the height of that of the functions fv and fw. Accordingly, the current of the phase U is double the size of that of the phase V or W. In principle, the current of the phase U always corresponds to the sum of the currents of the phases V and W which is clearly visible from FIG. 4.

An operating range ab may be defined around the operating point ag of the basic excitation. For example, the increase in the operating range ab is $\pi/3$. The limit values and/or limits of the operating range ab are accordingly $+/-\pi/6$ at ag. At these limits, relative to the axis X or the axis Y, a maximum force is exerted in one direction or in the opposing direction. For the control device it is sufficient, therefore, to select the operating point (control angle $\phi$) in the operating range ab in order to produce the required forces and/or counter forces. This applies both to the forces on the X-axis and the Y-axis.

This may be illustrated once again with reference to an example: if no current flows in the phase W (left-hand limit of the operating range ab) no current flows through the coil S1. The current in the phases U and V is thus the same but in the opposing direction. The coil S1 thus does not produce a field, whereas the coil S3 produces a maximum field. Accordingly, the magnetic radial bearing pulls the rotor 3 downward to the left according to FIG. 2 on the Y-axis. The same applies to all other operating points.

The combination according to the invention of an axial field with a three-phase supply with a magnetic radial bearing solves the essential problems of such bearings, in particular those of eddy current losses. As a whole, a magnetic radial bearing thus produced may be of very compact construction. Thus the bearing gap is reduced and the flexural vibration frequency of the shaft is increased. Moreover, the production costs may be kept very low.

What is claimed is:

1. A magnetic radial bearing, comprising:
 a stator comprising a first coil, a second coil, a third coil arranged opposite the first coil and a fourth coil arranged opposite the second coil, wherein the first and third coils are disposed on a first axis and the second and fourth coils are disposed on a second axis, and wherein first terminals of the first, second, third and fourth coils are connected to a first phase of a 3-phase current, second terminals of the third and fourth coils are connected to a second phase of the 3-phase current, and second terminals of the first and second coils are connected to a third phase of the 3-phase current, and
 a control device for controlling the coils of the stator by applying to each phase of the 3-phase current a respective sinusoidal current that is phase-shifted relative to a current of another phase of the 3-phase current by 120°, wherein the control device controls each of the first and second axes at a variable operating point, with the variable operating point defining amplitudes of the respective sinusoidal current of each of the phases of the 3-phase current.

2. The magnetic radial bearing of claim 1, wherein the first axis is oriented perpendicular to the second axis.

3. The magnetic radial bearing of claim 1, wherein the variable operating point is located within an operating range delimited by two limit values which have a predetermined spacing from an angle value, wherein the angle value is assigned to a point of intersection of the two of the sinusoidal currents.

4. The magnetic radial bearing of claim 3, wherein the operating range extends over $\pi/3$.

5. The magnetic radial bearing of claim 1, wherein the coils are each axial coils relative to a rotational axis of the radial bearing.

6. The magnetic radial bearing of claim 1, wherein the coils have an identical winding direction.

7. The magnetic radial bearing of claim 1, wherein the control device is configured to adjust a basic excitation of the coils so as to have a pole-pair number of zero.

8. The magnetic radial bearing of claim 1, wherein the control device is configured to adjust a load-bearing excitation of the coils so as to have a pole-pair number of one.

9. A method for controlling a magnetic radial bearing having a stator with a first coil, a second coil, a third coil arranged opposite the first coil and a fourth coil arranged opposite the second coil, wherein the first and third coils are disposed on a first axis and the second and fourth coils are disposed on a second axis, and wherein first terminals of the first, second, third and fourth coils are connected to a first phase of a 3-phase current, second terminals of the third and fourth coils are connected to a second phase of the 3-phase current, and second terminals of the first and second coils are connected to a third phase of the 3-phase current, the method comprising:
 with a control device, applying to each phase of the 3-phase current a respective sinusoidal current that is phase-shifted relative to a current of another phase of the 3-phase current by 120°, and
 with the control device, controlling respective amplitudes of the sinusoidal currents of each of the phases of the 3-phase current commensurate with a variable operating point for each of the first and second axes.

* * * * *